United States Patent
Johnsen et al.

(10) Patent No.: US 7,030,319 B2
(45) Date of Patent: Apr. 18, 2006

(54) FACEPLATE ATTACHMENT SYSTEM

(75) Inventors: Roger T. Johnsen, Salt Lake City, UT (US); Richard C. Hedderich, Sandy, UT (US); Brent D. Madsen, Providence, UT (US); Michael E. Dallon, West Valley City, UT (US)

(73) Assignee: Control4 Corporation, Draper, UT (US)

( * ) Notice: Subject to any disclaimer, the term of this patent is extended or adjusted under 35 U.S.C. 154(b) by 0 days.

(21) Appl. No.: 11/064,801

(22) Filed: Feb. 24, 2005

(65) Prior Publication Data

US 2005/0194176 A1    Sep. 8, 2005

Related U.S. Application Data

(60) Provisional application No. 60/547,449, filed on Feb. 25, 2004.

(51) Int. Cl.
*H02G 3/14* (2006.01)

(52) U.S. Cl. .......................... 174/66; 174/67; 220/241

(58) Field of Classification Search .................. 174/66, 174/67; 220/241, 242
See application file for complete search history.

(56) References Cited

U.S. PATENT DOCUMENTS

| | | | | |
|---|---|---|---|---|
| 4,835,343 A | * | 5/1989 | Graef et al. .................. | 174/66 |
| 4,924,349 A | | 5/1990 | Buehler et al. | |
| 5,189,259 A | * | 2/1993 | Carson et al. ................ | 174/66 |
| 5,895,888 A | | 4/1999 | Arenas et al. | |
| 5,961,345 A | | 10/1999 | Finn et al. | |
| 6,609,927 B1 | | 8/2003 | Kidman | |
| 6,750,398 B1 | * | 6/2004 | Richardson .................. | 174/58 |
| 6,779,423 B1 | | 8/2004 | Hammons et al. | |
| 6,806,425 B1 | * | 10/2004 | O'Neill ....................... | 174/66 |
| 2004/0134678 A1 | | 7/2004 | Kidman | |
| 2004/0235343 A1 | | 11/2004 | Kidman | |

* cited by examiner

*Primary Examiner*—Dhiru R. Patel
(74) *Attorney, Agent, or Firm*—Thorpe North & Western LLP

(57) ABSTRACT

A system is disclosed for mounting a faceplate. The system includes a sub-plate configured to be coupled to a junction box. The sub-plate can have an interference-fit socket extending through the sub-plate. The interference-fit socket includes one or more interference fingers located adjacent to a post opening. A post extending from the faceplate can be positioned and sized such that, as the faceplate is coupled to the sub-plate, the post will be received into the post opening in the interference-fit socket and engaged by the one or more interference fingers, enabling the faceplate to be securely mounted to the sub-plate.

20 Claims, 5 Drawing Sheets

FACEPLATE ATTACHMENT SYSTEM

CROSS-REFERENCE TO RELATED APPLICATIONS AND CLAIM OF PRIORITY

Priority is hereby claimed to U.S. Provisional Application No. 60/547,449 filed on Feb. 25, 2004, and titled "FACEPLATE ATTACHMENT SYSTEM".

BACKGROUND

Decorative faceplates for light switches and dimmers have generally been mounted via two widely used designs. One design involves using a common two-screw faceplate where the attachment screws extend through the faceplate and into threaded holes in the electrical switch or dimmer's metal yoke plate. The screw heads are visible and are therefore typically pre-painted by the faceplate manufacturer to match the color of the faceplate. A second type of design involves using a "screwless" two-piece faceplate and sub-plate system. In this second design, a non-visible sub-plate is typically attached to the yoke plate utilizing the yoke plate's threaded holes that would normally be used to mount the common two-screw faceplate. Then these screws are hidden when the decorative screwless faceplate is snapped onto the sub-plate through some proprietary mating system.

Prior two-piece mating systems tend to use either 1) multiple slots on a sub-plate with corresponding snaps that lock into the slots, or 2) knife edges on the top and bottom of the sub-plate, with corresponding grooves on the faceplate that together create a "ratcheting" mechanism. Such snap systems work for mounting faceplates, but tend to rattle, which can reduce its appeal from the customers' perspective. Further, the snap system typically accommodates just one faceplate mounting depth in relation to the wall.

The ratcheting system improves on the snap system because it tends to rattle less and allows for different mounting depths in relation to the wall due to its parallel-spaced ratchet grooves, but the sub-frame can be fragile and easily broken upon repeated removal and attachment.

SUMMARY

A system is disclosed for mounting a faceplate. The system includes a sub-plate configured to be coupled to a junction box. The sub-plate can have an interference-fit socket extending through the sub-plate. The interference-fit socket comprises one or more interference fingers located adjacent to a post opening. A post extending from the faceplate can be positioned and sized such that, as the faceplate is coupled to the sub-plate, the post will be received into the post opening in the interference-fit socket and engaged by the one or more interference fingers, enabling the faceplate to be securely mounted to the sub-plate.

DETAILED DESCRIPTION

Figure 1:
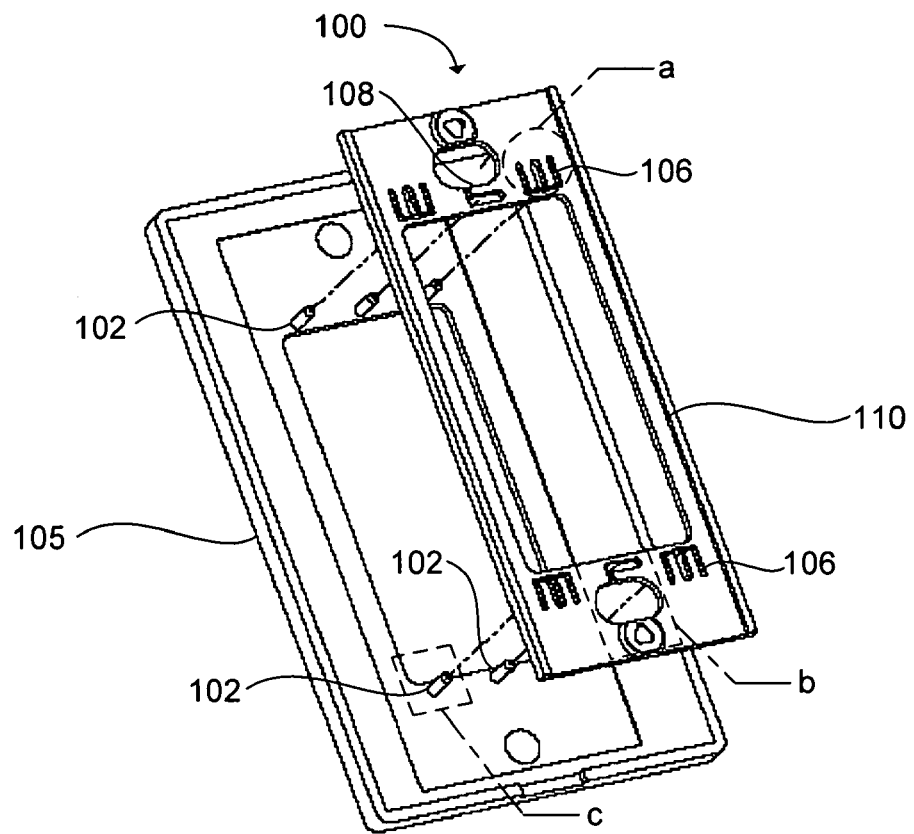
FIG. 1 is a perspective exploded view of a faceplate attachment system having a center-finger socket in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

An example embodiment, as illustrated in FIG. 1, provides a faceplate attachment system 100 that consists of a plurality of posts 102 extending perpendicularly from the back side of a faceplate 105 which mates with a corresponding number of interference-fit sockets 106 located in a sub-plate 110.

Figure 1A:
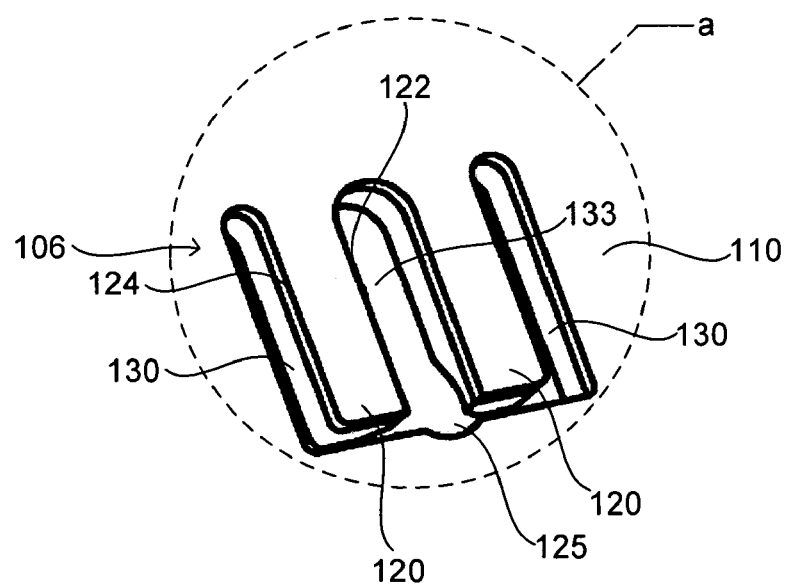
FIG. 1a is a magnified perspective view of an interference-fit-socket circled in "a" of FIG. 1.

Each interference-fit socket 106 can include a post opening 125 in the faceplate which has a width less than a width of the diameter of the post, as shown in FIG. 1a, which shows a magnified view of one embodiment of an interference-fit socket circled in "a" in FIG. 1. The post opening can be located adjacent to one or more interference fingers 120. Each interference finger can include a first side 122 and a second side 124. The first side can face the post opening while the second side can face an area 130 that is substantially open for at least a portion of the length of the interference finger. The first side may also have an open area 133 that is substantially open for a portion of the length of the interference finger.

Figure 1B:
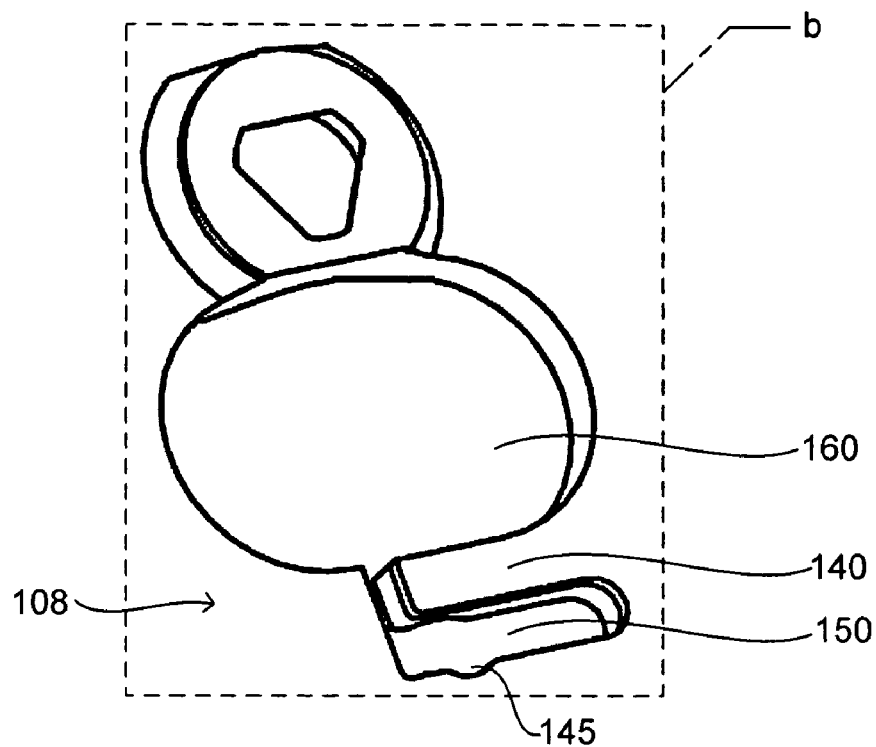
FIG. 1b is a magnified perspective view of another embodiment of an interference-fit socket outlined in "b" of FIG. 1.

An interference-fit socket 108 may also be formed using a single interference finger 140, as shown in FIG. 1b, which shows a magnified view of a single-finger socket outlined in "b" in FIG. 1. A post opening 145 may be located at the distal end of the interference finger 140 relative to the sub-plate 110 or at another advantageous location on the finger. Open areas 150 and 160, may be substantially open for the length of the interference finger, wherein the open areas are located adjacent to the interference finger.

The interference-fit aspect of this mating system is utilized when inserting a post 102 having an outer diameter slightly larger than the inner diameter of the post opening 125. Insertion of the post forces the somewhat flexible interference fingers 120 to flex outwardly away from the post. This provides spring tension or back pressure on the post, thus holding the post in place.

The embodiments of the faceplate attachment system provide several advantages: 1) the system is a simple, robust, and cost-effective mating system that is easy to tool for an injection-molding process; 2) once the post is inserted into the socket beyond the tapered section of the post, the insertion force and retention ability is substantially constant with depth; 3) the insertion and retention forces can easily be modified in the design process by changing the geometries of the socket features and/or by changing the material composition; 4) in contrast to many prior systems, the faceplate can be "snugged" up against walls of varying depths, and even against walls of varying flatness since the depth of insertion of each post can be somewhat different (within the limits of distorting the flatness of the somewhat flexible faceplate); 5) the mated pieces form a more mechanically integrated system versus prior known systems, and thus reduces rattle; 6) the faceplate can be quite secure, yet allow for easy removal by the user, and 7) given an appropriate material, its retention force can remain substantially constant for many years.

Returning to FIG. 1, each post 102 can extend perpendicular from the faceplate 105. The post can be positioned and sized such that, as the faceplate is coupled to the sub-plate 110, the post can be received into the post opening 125 (FIG. 1a) in the interference-fit socket 106 and engaged by the one or more interference fingers 120 (FIG. 1a), enabling the faceplate to be securely mounted to the sub-plate. The one or more interference fingers are configured to flex away from the post as the post is received, providing spring tension on the post to apply resistance to movement of the faceplate when the post is engaged by the one or more interference fingers.

The post opening can be formed from an indention in one or more interference fingers. For example, in the embodiment shown in FIG. 1a, wherein the interference-fit socket 106 comprises two fingers, the post opening 125 is formed from indentations in the interference fingers at a distal end of the fingers relative to the sub-plate. A third indentation is also formed in the sub-plate across from and between the two fingers. Together, the three indentations form a circular area to guide the post as it is received by the interference-fit socket.

Another example of a post opening is shown in the embodiment in FIG. 1b, wherein the interference-fit socket 108 comprises one finger. The post opening 145 is formed from an indentation in the finger 140 and an indentation in the sub-plate directly across from the finger indentation. The two indentations form a circular area to guide the post, as in FIG. 1a. The post opening does not need to be circular. Any shape of post opening may be used which can enable the post to be guided into the interference-fit socket. The post opening may have an oval, square, rectangular, triangular, octagonal, or some other polygonal shape.

While the post opening is shown in an end of the one or more interference fingers that is distal to the sub-plate, it is also possible for the post opening to be located near a middle of the one or more interference fingers. The post opening may even be located near a proximal end of the interference fingers, opposite the distal end, where the fingers are attached to the sub-plate. The placement of the post opening can be determined by the desired resistance to be applied by the fingers and the characteristics of the material used to form the sub-plate and interference fingers, such as strength, elasticity, brittleness, and other relevant factors.

Figure 1C:
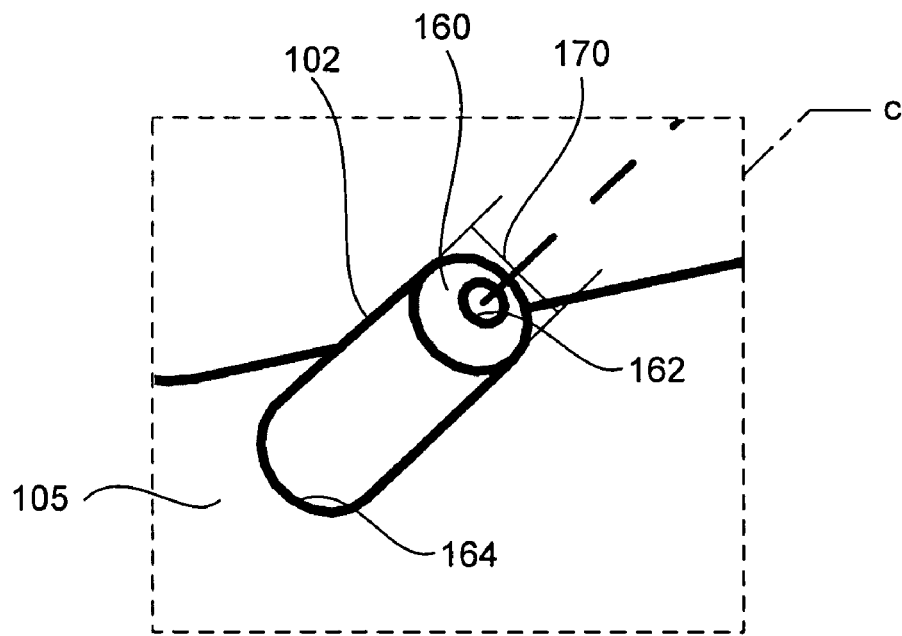
FIG. 1c is a magnified perspective view of a post outlined in "c" of FIG. 1.

Referring to FIG. 1c, the distal end 162 of each post 102 can be tapered 160 to easily allow initial alignment and insertion into the interference-fit socket. Beyond the tapered end, each post may have a substantially consistent diameter for the remaining length of the post down to the proximal end 164 of the post where it attaches to the faceplate 105. In another embodiment, the entire post can be tapered. The post may have a substantially smooth surface. In another embodiment, the post may be formed with grooves, or a roughened surface to increase the amount of resistance in movement between the post and the interference fingers. Each post can have a width or outer diameter 170 which enables a predetermined amount of resistance to occur when the post is engaged by the one or more interference fingers.

Figure 2A:
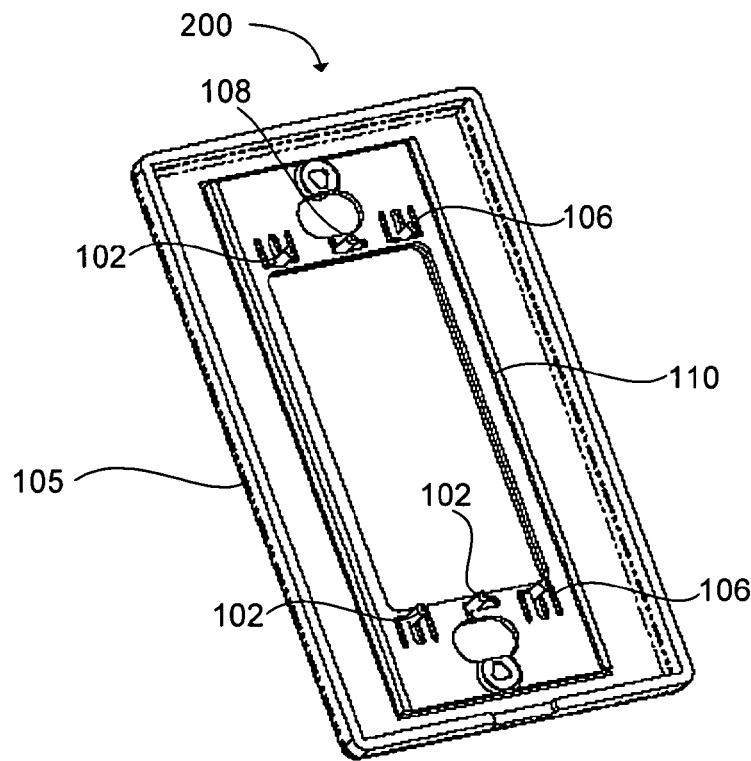
FIG. 2a is a perspective view of the faceplate attachment system of FIG. 1.

A single sub-plate may have a plurality of interference-fit sockets that are all substantially similar, or there may be two or more different types of interference-fit sockets. For example, FIG. 2a shows one embodiment of a faceplate attachment system 200 wherein the faceplate 105 is coupled to the sub-plate 110 using six interference-fit sockets. Four of the interference sockets 106 each have two interference fingers and are located in the four corners of the sub-plate. Two of the interference sockets 108 each have one interference finger and are located near the center of the sub-plate on opposite ends. Six posts 102 extend perpendicular from the faceplate. The posts are positioned on the faceplate and sized such, that as the faceplate is coupled to the sub-plate, the posts are received into the post opening in the interference-fit sockets and engaged by the one or more interference fingers in each of the interference sockets. By engaging the posts in the interference-fit sockets, the faceplate can be securely mounted to the sub-plate.

Figure 2B:
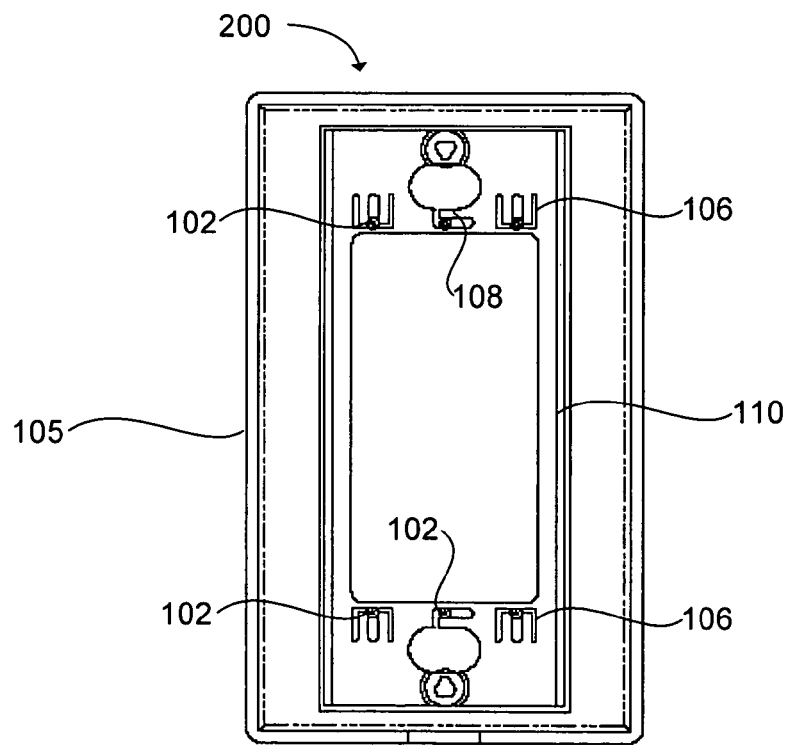
FIG. 2b is a rear view of the faceplate attachment system of FIG. 1.

FIG. 2b shows a back orthogonal view of a faceplate attachment system 200 of FIG. 2a. Each of the six posts 102 are visible as they extend through the post openings 125, 145 (FIGS. 1a, 1b) in each of the interference-fit sockets 106, 108 respectively. The posts are positioned on the faceplate 105 such that they will align with the interference-fit sockets and engage the interference fingers 120, 140 (FIGS. 1a, 1b) when the faceplate is coupled to the sub-plate 110. The interference fingers can be formed of a material (e.g. plastic or metal) which will enable them to flex and provide resistance to movement of the posts, and thus the faceplate.

Figure 3:
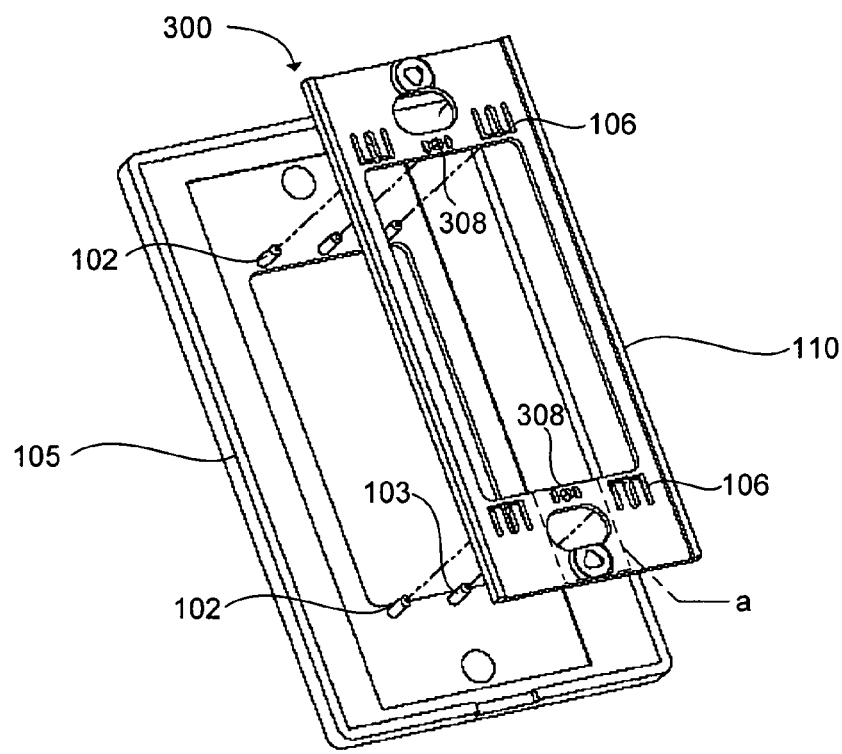
FIG. 3 is a perspective exploded view of a faceplate attachment system having a center hole socket in accordance with an embodiment of the present invention.

Another embodiment comprises a faceplate attachment system 300 having a center-hole guide 308, as shown in FIG. 3. The center-hole guide can be used to help align the posts 102 into the interference-fit sockets 106. In one embodiment, one or more center-hole posts 103 can be configured to fit into one or more center-hole guides 308, wherein the center-hole posts are substantially similar to the one or more posts used in conjunction with the interference-fit sockets 106. In another embodiment, the center-hole posts used to fit into the one or more center-hole guides can be a different type of post than the posts used to mate with the interference-fit sockets.

Figure 3A:
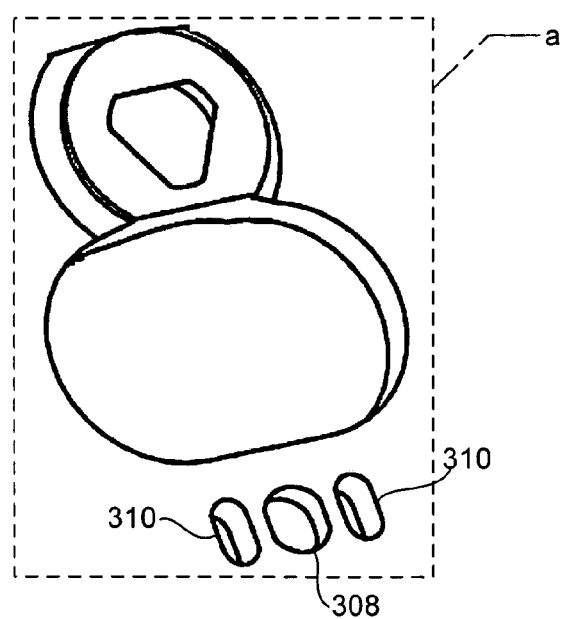
FIG. 3a is a magnified perspective view of a center-hole socket circled in "a" of FIG. 3.

The faceplate 105 can be coupled to the sub-plate 110 by mating the posts 102 with the one or more interference-fit sockets 106 and mating the one or more center-hole posts 103 with the one or more center-hole guides 308. FIG. 3a shows a magnified view of the center-guide hole outlined in "a" in FIG. 3. A center-hole post can be received through the guide hole 308. The center hole-post and center-hole guide can be used to align the faceplate to the sub-plate so that the posts 102 will correctly mate with the interference-fit sockets 106.

In an additional embodiment, the center hole guide may be an interference socket also. In particular, the center hole may have a beam or finger that is fixed on both ends or the finger may have a free end. Even though a single finger or beam in the center hole may not have a free end and may not flex as much as an interference finger with a free end, the interference finger can still contribute to holding the faceplate.

Figure 4:
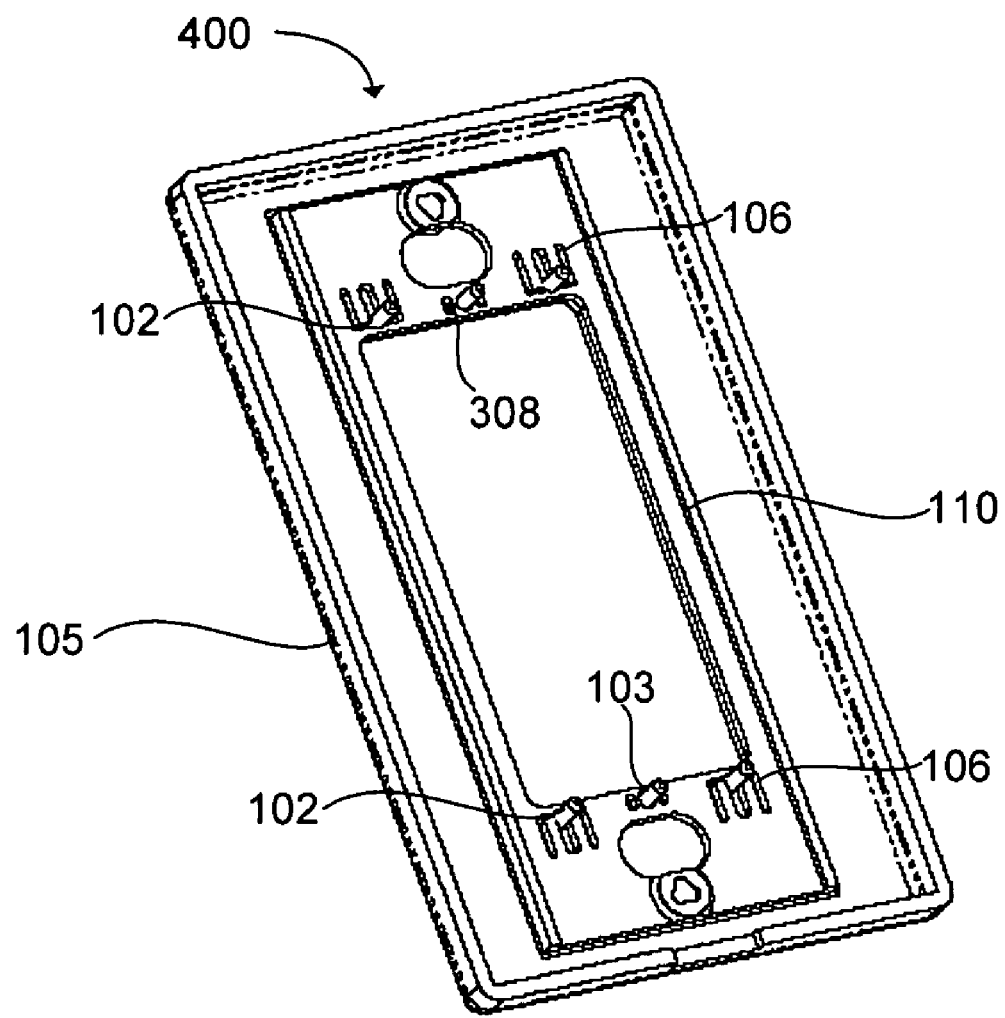
FIG. 4 is a perspective view of the faceplate attachment system of FIG. 3.

FIG. 4 shows one embodiment of a faceplate attachment system 400 wherein the faceplate 105 is coupled to the sub-plate 110 using four interference-fit sockets 106 and two center-hole guides 308. The four interference sockets 106 each have two interference fingers and are located in the four corners of the sub-plate. The two center-hole guides 308 are located near the center of the sub-plate on opposite sides. Four posts 102 extend from the faceplate and are aligned with the four interference sockets. Two center-hole posts 103 also extend from the faceplate at a position to mate with the center-hole guides and enable the four posts to be better aligned with the interference-fit sockets. The posts are positioned on the faceplate and sized such that as the faceplate is coupled to the sub-plate, the posts are received into the post opening in the interference-fit socket and engaged by the one or more interference fingers in each of the interference sockets. By engaging the posts in the interference-fit sockets, the faceplate can be securely mounted to the sub-plate.

The interference-fit sockets can be simply formed in plastic having some characteristic of flexibility. Examples of plastic that can be used are Delrin or ABS (which includes any of a class of plastics based on acrylonitrile-butadiene-styrene copolymers).

The number, shape, and placement of interference fingers can be changed to achieve varying insertion and retention forces. The number, shape, and placement of posts can be changed as well. Posts made of another material, such as spring steel, inserted into a post opening could accomplish the same purpose, but at the expense of added cost and complexity.

This discussion has been defined using the term "interference-fit socket", but there are a number of technical terms that could reasonably describe the interaction between the post and socket. For example, end products in which the invention may be used are products purchased by home owners, home automation users, government facilities, commercial installations, or any other location desiring an effective and aesthetic face plate mounting system.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A system for mounting a faceplate, comprising:
   a sub-plate configured to be coupled to a junction box;
   an interference-fit socket extending through the sub-plate, wherein the interference-fit socket comprises one or more interference fingers located adjacent to a post opening;
   a post extending from the faceplate, the post being positioned and sized such that as the faceplate is coupled to the sub-plate the post will be received into the post opening in the interference-fit socket and engaged by the one or more interference fingers, enabling the faceplate to be securely mounted to the sub-plate; and
   wherein the post opening having a size less than a width of the post.

2. The system of claim 1, wherein each of the one or more interference fingers has a first side and a second side, the first side facing the post opening while the second side faces an area that is substantially open for a portion of a length of each of the one or more interference fingers.

3. The system of claim 1, wherein the post opening is formed from an indention in the one or more interference fingers.

4. The system of claim 3, wherein the indention is located at a distal end of the one or more interference fingers, wherein the distal end is distal with respect to the sub-plate.

5. The system of claim 1, wherein the post has a substantially smooth surface.

6. The system of claim 1, wherein the post has a roughened surface to increase resistance of movement between the post and the one or more interference fingers.

7. The system of claim 1, wherein the post has a taper at a first end that is received when the faceplate is coupled to the sub-plate and a substantially consistent diameter for a remaining length of the post.

8. The system of claim 1, wherein the interference-fit socket comprises two interference fingers located symmetrically about the post opening, wherein the two interference fingers are connected to the sub-plate.

9. The system of claim 1, wherein the one or more interference fingers are configured to flex away from the post as the post is received, providing spring tension on the post to apply resistance to movement of the faceplate when the post is engaged by the one or more interference fingers.

10. The system of claim 1, further comprising a plurality of interference-fit sockets located within the sub-plate.

11. The system of claim 10, further comprising a plurality of posts, the posts being positioned such that as the faceplate is coupled to the sub-plate the plurality of posts will be received into the plurality of interference-fit sockets.

12. The system of claim 11, wherein the interference-fit socket from the plurality of interference-fit sockets is located in each corner of the sub-plate.

13. The system of claim 1, wherein sub-plate contains one or more interference-fit sockets having two interference fingers.

14. The system of claim 1, wherein sub-plate contains one or more interference-fit sockets having one interference finger.

15. The system of claim 1, wherein sub-plate contains one or more interference-fit sockets having two interference fingers and the one or more interference sockets having one interference finger.

16. The system of claim 1, further comprising one or more center-hole guides extending through the sub-plate, the one or more center-hole guides configured to receive a center-hole post extending from the faceplate.

17. The system of claim 16, wherein the center-hole post has a different configuration from the post used to engage the interference fingers.

18. The system of claim 1, wherein the sub-plate and one or more interference-fit fingers are comprised of one or more materials selected from the group consisting of metal, Delrin®, and plastics based on acrylonitrile-butadiene-styrene copolymers.

19. A system for mounting a faceplate, comprising:
   a sub-plate configured to be coupled to a junction box;
   an interference-fit socket extending through the sub-plate, wherein the interference-fit socket comprises one or more interference fingers located adjacent to a post opening, wherein each of the one or more interference fingers has a first side and a second side, the first side facing the post opening while the second side faces an area that is substantially open for a length of the interference finger;

a post extending from the faceplate, the post being positioned and sized such that as the faceplate is coupled to the sub-plate the post will be received into the post opening in the interference-fit socket and engaged by the one or more interference fingers, enabling the faceplate to be securely mounted to the sub-plate; and the post opening having a size less than a width of the post.

20. A system for mounting a faceplate, comprising:

a sub-plate configured to be coupled to a junction box;

a post extending from the faceplate;

an interference-fit socket extending through the sub-plate, wherein the interference-fit socket comprises one or more interference fingers, wherein each of the one or more interference fingers has a first side and a second side, the first side having an indentation configured to receive the post, while the second side faces an area that is substantially open for a length of the interference finger; and the post being positioned and sized such that as the faceplate is coupled to the sub-plate the post will be received into the indentation in the one or more interference fingers and engaged by the one or more interference fingers, enabling the faceplate to be securely mounted to the sub-plate.

* * * * *